(12) United States Patent
Srinivasan

(10) Patent No.: US 11,106,527 B2
(45) Date of Patent: Aug. 31, 2021

(54) HARDWARE ERROR CORRECTIONS BASED ON POLICIES

(71) Applicant: Hewlett Packard Enterprise Development LP, Houston, TX (US)

(72) Inventor: Latha Srinivasan, Glen Mills, PA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 156 days.

(21) Appl. No.: 15/966,344

(22) Filed: Apr. 30, 2018

(65) Prior Publication Data

US 2019/0332463 A1  Oct. 31, 2019

(51) Int. Cl.
  *G06F 11/00* (2006.01)
  *G06F 11/07* (2006.01)

(52) U.S. Cl.
  CPC ...... *G06F 11/0793* (2013.01); *G06F 11/0709* (2013.01); *G06F 11/0751* (2013.01); *G06F 11/0772* (2013.01)

(58) Field of Classification Search
  CPC .................................................. G06F 11/0781
  See application file for complete search history.

(56) References Cited

U.S. PATENT DOCUMENTS

| | | | |
|---|---|---|---|
| 7,475,293 B1 | 1/2009 | Little et al. | |
| 7,490,073 B1 | 2/2009 | Qureshi et al. | |
| 7,577,542 B2 | 8/2009 | Vacar et al. | |
| 9,021,310 B1 | 4/2015 | McCabe et al. | |
| 2004/0210800 A1* | 10/2004 | Ghislain Gabriel Vecoven ......... | G06F 11/0712 714/4.2 |
| 2005/0229039 A1* | 10/2005 | Anderson ............. | G06F 9/4401 714/23 |
| 2010/0293440 A1* | 11/2010 | Thatcher ............... | G06F 11/073 714/764 |
| 2011/0218957 A1* | 9/2011 | Coon .................. | G06Q 30/0601 706/54 |
| 2012/0023375 A1* | 1/2012 | Dutta .................. | G06F 11/0754 714/47.2 |
| 2012/0271937 A1* | 10/2012 | Cotten .................. | G06Q 10/10 709/224 |
| 2016/0294800 A1 | 10/2016 | Oppenheim, Jr. et al. | |

(Continued)

OTHER PUBLICATIONS

NPL: Google Scholar/Patents—text refined (Year: 2020).*

(Continued)

*Primary Examiner* — Christopher S McCarthy
(74) *Attorney, Agent, or Firm* — Tong, Rea, Bentley & Kim, LLC

(57) ABSTRACT

In example implementations, an apparatus is provided. The apparatus includes a communication interface, a non-transitory computer readable storage medium, a processor, and an actuator device. The communication interface receives alerts associated with hardware errors from a data center management system (DCMS). The non-transitory computer readable medium is stores a policy that defines rules for correcting the hardware errors associated with the alerts. The processor compares each one of the hardware errors from the alerts to the policy to identify correctable hardware errors from the hardware errors. The actuator devices generates a control signal that is transmitted to the DCMS via the communication interface to initiate a correction action for the correctable hardware errors.

22 Claims, 4 Drawing Sheets

(56) References Cited

U.S. PATENT DOCUMENTS

2016/0359915 A1 12/2016 Gupta et al.
2017/0257303 A1 9/2017 Boyapalle et al.
2017/0269990 A1* 9/2017 Liu ..................... G06F 11/0793

OTHER PUBLICATIONS

Google Scholar/Patents—text refined (Year: 2021).*
Alan Sardella, "Integrating SLX Telemetry Streaming with Splunk Enterprise," Nov. 26, 2017, pp. 1-5 [online], Retrieved from the Internet on Dec. 14, 2017 at URL: <content.extremenetworks.com/extreme-networks-blog/integrating-six-telemetry-streaming-with-splunk-enterprise>.

* cited by examiner

HARDWARE ERROR CORRECTIONS BASED ON POLICIES

BACKGROUND

Data center management systems allow a customer to deploy an infrastructure of a variety of different hardware devices. The data center management system may monitor and manage the lifecycle of the infrastructure and integrate the infrastructure workflow processes into a customer's business operations.

DETAILED DESCRIPTION

Examples described herein provide an apparatus and method for correcting hardware errors in a data center management system. As discussed above, data center management systems (DCMS) allow a customer to deploy an infrastructure of a variety of different hardware devices. The hardware devices in the DCMS can occasionally fail and generate error messages and alerts.

Currently, a technician or a user may monitor the alerts and identify hardware errors that can be corrected by the technician. For example, the technician may perform a corrective action to clear the hardware error. However, manual correction can increase costs and down time that can lead to inefficient operation of the DCMS.

Examples of the present disclosure provide an automated remediation engine that can automatically correct hardware errors that are detected in the DCMS. The automated remediation engine may subscribe to alerts generated by the DCMS. The alerts may be filtered for actionable alerts (e.g., alerts that indicate a hardware error that can be corrected automatically by the automated remediation engine).

The actionable alerts may be compared to a policy. The policy may indicate whether the automated remediation engine can take action to correct the actionable alert. If the policy gives the automated remediation engine permission to correct the actionable alert, then the automated remediation engine may generate a control signal that is transmitted to the DCMS to initiate a correction of the actionable alert.

As a result, certain hardware errors can be corrected without a technician or manual intervention. This may allow the DCMS to operate more efficiently by reducing down time and costs associated with hardware errors.

Figure 1:
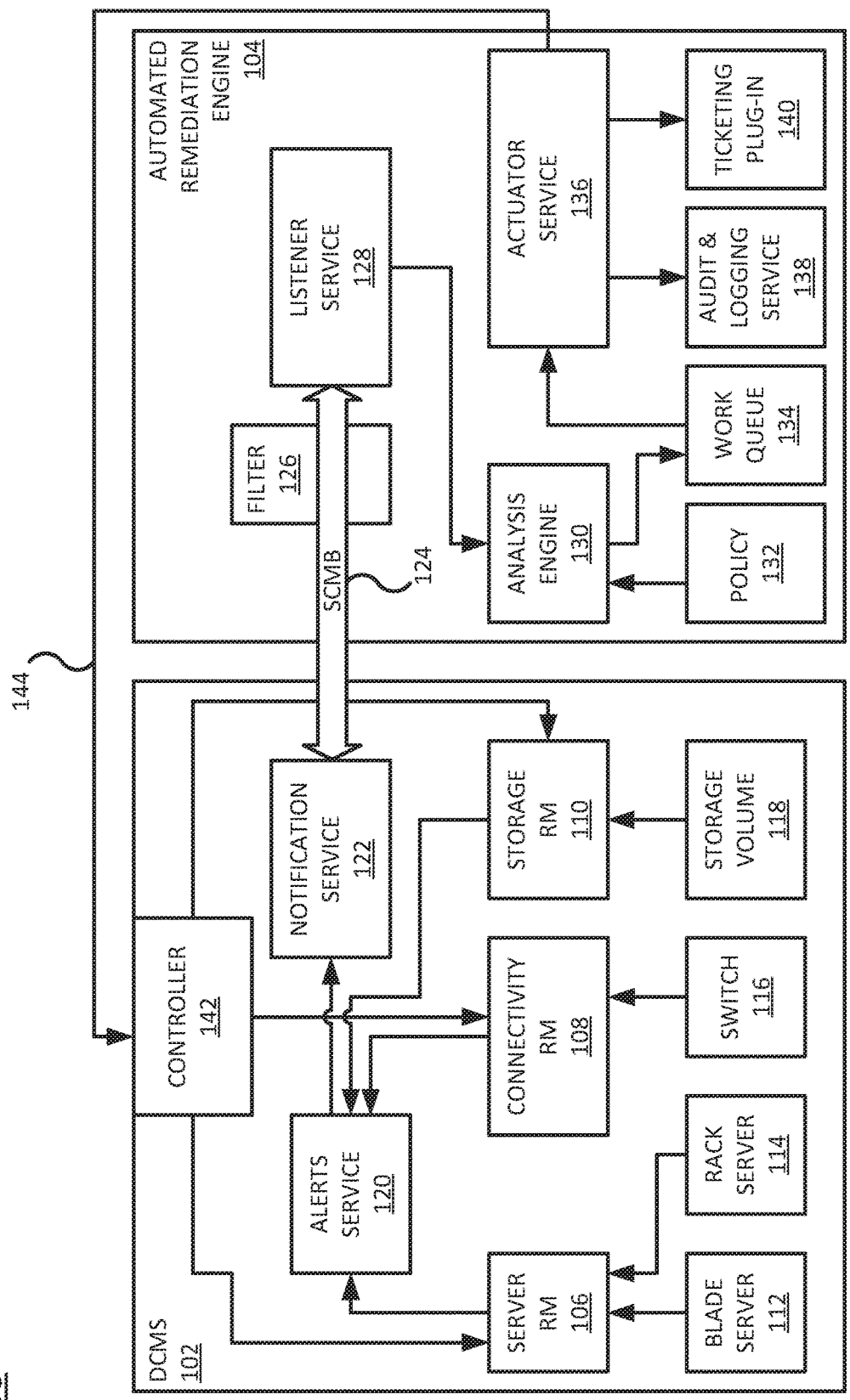
FIG. 1 is a block diagram of an example system including a data center management system and automated remediation engine of the present disclosure.

FIG. 1 illustrates an example system 100 of the present disclosure. In one example, the system 100 may include a data center management system (DCMS) 102 and an automated remediation engine (ARE) 104. In one example, the DCMS 102 may be located within an enterprise location or across different geographic locations of an enterprise. The ARE 104 may be located remotely from the DCMS 102. The ARE 104 may be deployed as a single computing device or server or as multiple different computing devices or servers.

In one example, the DCMS 102 may include a plurality of resource managers (RMs), such as a server RM 106, a connectivity RM 108, and a storage RM 110. It should be noted that although three types of RMs are illustrated in FIG. 1, that the DCMS 102 may include any number, or different types, of RMs. In one example, the RMs 106, 108, and 110 may be deployed as servers with a processor and a memory that control and manage operations of respective network devices within the DCMS 102.

For example, the server RM 106 may be communicatively coupled to a blade server 112, a rack server 114, or any other type of server. It should be noted that other types of servers may be deployed. It should also be noted that any number of servers may be coupled to the server RM 106. The server RM 106 may monitor and control operations of the blade server 112 and the rack server 114.

The connectivity RM 108 may be communicatively coupled to a switch 116. It should be noted that the connectivity RM 108 may be connected to any type of connectivity network device or any number of connectivity network devices. The connectivity RM 108 may monitor and control operations of the switch 116.

The storage RM 110 may be communicatively coupled to a storage volume 118. It should be noted that the storage RM 110 may be connected to any type of storage device (e.g., a database, a series of hard disk drives, network storage devices, and the like) or any number of storage devices. The storage RM 110 may monitor and control operations of the storage volume 118.

In one example, when one of the network devices (e.g., the blade server 112, the rack server 114, the switch 116, or the storage volume 118) has an error, the respective RM 106, 108, or 110 may generate an alert. The alert may include information regarding a type of error, which network device had the error, a time the error was detected, and the like.

In one example, the alerts may be collected by an alerts service 120. The alerts service 120 may be a server or a computing device that is communicatively coupled to the RMs 106, 108, and 110. The alerts service 120 may display the alerts to a technician.

In one example, the alerts service 120 may be communicatively coupled to a notification service 122. The notification service 122 may broadcast the alerts from the alerts service 120 to anyone who subscribes to the notification service 122. In one example, the alerts may be broadcast over a state change message bus (SCMB) 124.

In one example, the ARE 104 may subscribe to the notification service 122 and receive the alerts over the SCMB 124. The ARE 104 may analyze the alerts, identify actionable alerts (e.g., alerts that are associated with errors that can be corrected automatically), and automatically correct the errors in the actionable alerts.

In one example, the ARE 104 may include a filter 126 and a listener service 128. The listener service 128 may receive the alerts over the SCMB 124 from the notification service 122 of the DCMS 102. The listener service 128 may establish a secure connection over the SCMB 124 with the notification service 122. For example, a login and password may be used. In one example, when the listener service 128 subscribes to the alerts a security token may be provided to the listener service 128 that is used for authentication. Any type of authentication method may be used to establish a secure connection.

In one example, the filter 126 may filter the alerts for the listener service 128. The filter 126 may remove non-actionable alerts. For example, the filter 126 may have pre-defined key words to remove non-actionable alerts. For example, the key words may be hardware failure, power outage, and the like that indicate errors that cannot be automatically corrected. The key words may include words associated with hardware errors used to identify actionable alerts, or correctable errors, such as, reset, recycle, reboot, software configuration change, parameter change, and the like.

The listener service 128 may then forward the filtered alerts to an analysis engine 130. The analysis engine 130 may analyze the alerts to identify certain information. The information can be used to determine whether the alert can be corrected in accordance with a policy 132.

The policy 132 may be defined by a customer to include rules for when actionable alerts or correctable errors may be automatically corrected. For example, the rules may define which network devices may be automatically corrected, what type of errors may be automatically corrected, what times the errors may be automatically corrected, and the like.

For example, the network devices (e.g., the blade server 112, the rack server 114, the switch 116, or the storage volume 118) may have routine maintenance from 2:00 AM until 3:00 AM. Thus, a rule of the policy 132 may be to ignore alerts received between 2:00 AM and 3:00 AM.

During the maintenance errors may be detected and alerts may be generated by an RM 106, 108, or 110. The alerts may be received by the listener device 128 and forwarded to the analysis engine 130. The analysis engine 130 may identify that the alert was received at 2:20 AM, which within the time period defined by the policy 132 to ignore alerts. Thus, the alert may be not automatically corrected based on the policy 132.

In another example, a rule of the policy 132 may be to not correct alerts associated with the rack server 114. As a result, if an alert associated with the rack server 114 is received, the analysis engine 130 may determine that the error should not be corrected based on the rule stored in the policy 132.

In another example, a rule of the policy 132 may be to not correct configuration errors. For example, a technician may be running a test based on a new set of configuration parameters. Thus, when an alert is received associated with a configuration error, the analysis engine 130 may not correct the error based on the rule stored in the policy 132.

It should be noted that the policy 132 may store any combination of the rules. For example, some rules may be based on a time period and a particular network device, other rules may be based on a particular network device and a particular type of error, or some rules may be based on a time period, a particular network device, and a particular type of error.

In one example, the policy 132 may be dynamically changed. For example, the policy 132 may be modified at any time by the customer.

When the analysis engine 130 determines that an error in an alert is correctable based on the policy 132, the analysis engine 130 may forward the alert to a work queue 134. An actuator service 136 may automatically correct each error in the work queue 134. In one example, the actuator service 136 may use a first in first out method to correct the alerts in the work queue 134. In one example, multiple actuator services 136 may be deployed, or the actuator service 136 may have parallel processing capabilities. Thus, the multiple alerts in the work queue 134 may be automatically corrected simultaneously.

In one example, the actuator service 136 may generate a control signal to correct the error in the alert. For example, if the error can be corrected with a reboot of the blade server 112, the actuator service 136 may generate a control signal to initiate the reboot of the blade server 112.

In one example, the control signal may be transmitted to a controller 142 of the DCMS 102 over a secure communication path 144. The secure communication path 144 may be established via an authentication method. The authentication method may be the same or different than the authentication method used to establish a secure communication path over the SCMB 124.

The controller 142 may forward the control signal to the server RM 106 that controls and manages the blade server 112. The server RM 106 may execute the control signal by restarting the blade server 112 to correct the error.

In one example, when the error is successfully corrected, the server RM 106 may generate a notification indicating that the hardware error was successfully corrected. The notification may be forwarded back to the controller 142 and returned to the actuator service 136 over the secure communication path 144. The actuator service 136 may then clear the alert from the work queue 134 and automatically correct the error associated with the next alert in the work queue 134. The process may be repeated until all of the alerts and associated hardware errors in the work queue 134 are automatically corrected.

It should be noted that the above example with the server RM 106 and the blade server 112 is one example. The control signal may be similarly sent to the connectivity RM 108 and the storage RM 110 to correct hardware errors on other network devices such as the switch 116, the storage volume 118, and the like.

In one example, an audit and logging service (or logging device) 138 may be communicatively coupled to the actuator service 136. After the notification is received by the actuator service 136, the actuator service 136 may notify the audit and logging service 138. The audit and logging service 138 may create and store a log of each error correction event. The log may include details such as a time that the control signal was generated and transmitted back to the DCMS 102, which network device was automatically corrected, what type of error was corrected, an indication if a notification was received indicating a successful correction of the network device, a time the notification was received, and the like.

In one example, the ARE 104 may include a ticketing plug-in (or ticket generation device) 140. The ticketing plug-in 140 may generate a work order, work ticket, and the like, if no notification of successful error correction is received from the DCMS 102. For example, in some instances, the hardware error may not be automatically corrected by the control signal generated by the actuator service 136. If no notification is received within a predefined time period (e.g., after 30 minutes, after 1 hour, after 1 day, and the like), a time-out condition may be triggered and the ticketing plug-in 140 may generate a work order to have the error condition manually corrected.

Figure 2:
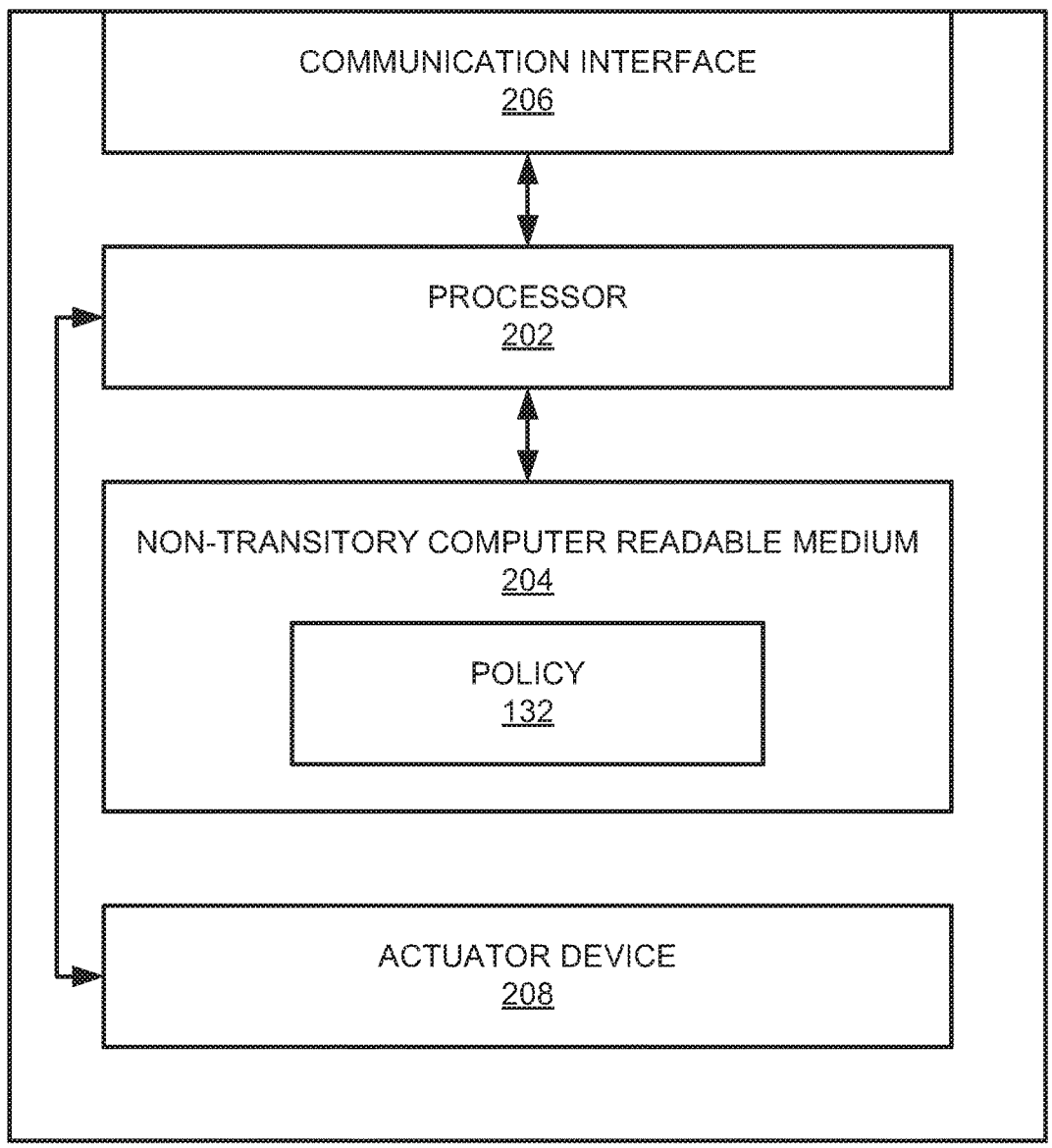
FIG. 2 is a block diagram of the automated remediation engine of the present disclosure.

FIG. 2 illustrates a block diagram of an example ARE 104. In one example, the ARE 104 may include a processor 202, a non-transitory computer readable medium 204, a communication interface 206, and an actuator device 208. In one example, the processor 202 may be communicatively coupled to the non-transitory computer readable medium 204, the communication interface 206, and the actuator device 208. The processor may execute instructions stored on the non-transitory computer readable medium 204.

In one example, the non-transitory computer readable medium 204 may store the policy 132 to determine which alerts are correctable. As noted above, the policy 132 may be defined by a customer. The policy 132 may include policies for different customers. For example, the ARE 104 may automatically correct hardware errors of different DCMS 102 of different customers.

In one example, the communication interface 206 may receive alerts associated with hardware errors from the DCMS 102. The communication interface 206 may be part of the listener service 128 described above in FIG. 1. The communication interface 206, as a component that is part of the ARE 104, may establish a wired or wireless connection. For example, the communication interface 206 may include Ethernet ports for a wired connection or a radio for a wireless connection. It should be noted that the communication interface 206 is not part of the DCMS 102. The communication interface 206 may be hosted separately from the DCMS 102 in a hosted provider or cloud (e.g., the ARE 104) or separated by a wide area network (WAN).

In one example, the processor 202 may compare each one of the hardware errors from the alerts to the policy 132 to identify correctable hardware errors from the hardware errors in the received alerts. The correctable hardware errors may then be placed in a queue (e.g., the work queue 134) for processing by the actuator device 208.

In one example, the actuator device 208 may be similar to the actuator service 136. For example, the actuator device 208 may generate a control signal that is transmitted to the DCMS 102. The control signal may be transmitted via the communication interface 206 to the DCMS 102. The control signal may initiate a correction action in the DCMS 102 for the correctable hardware errors. The control signal may be a signal to perform a reset, a signal to perform a power cycle, a signal to change setting, and the like.

For example, as described above, the correction actions may be based on the control signal for the particular correctable hardware error to be corrected. For example, the correction actions may be resetting a network device, performing a power cycle of network device, changing a setting of the network device (e.g., a configuration setting or parameter), and the like.

As a result, the ARE 104 may automatically correct certain hardware errors without a technician or manual intervention. This may allow the DCMS 102 to operate more efficiently by reducing down time and costs associated with hardware errors, as noted above.

Figure 3:
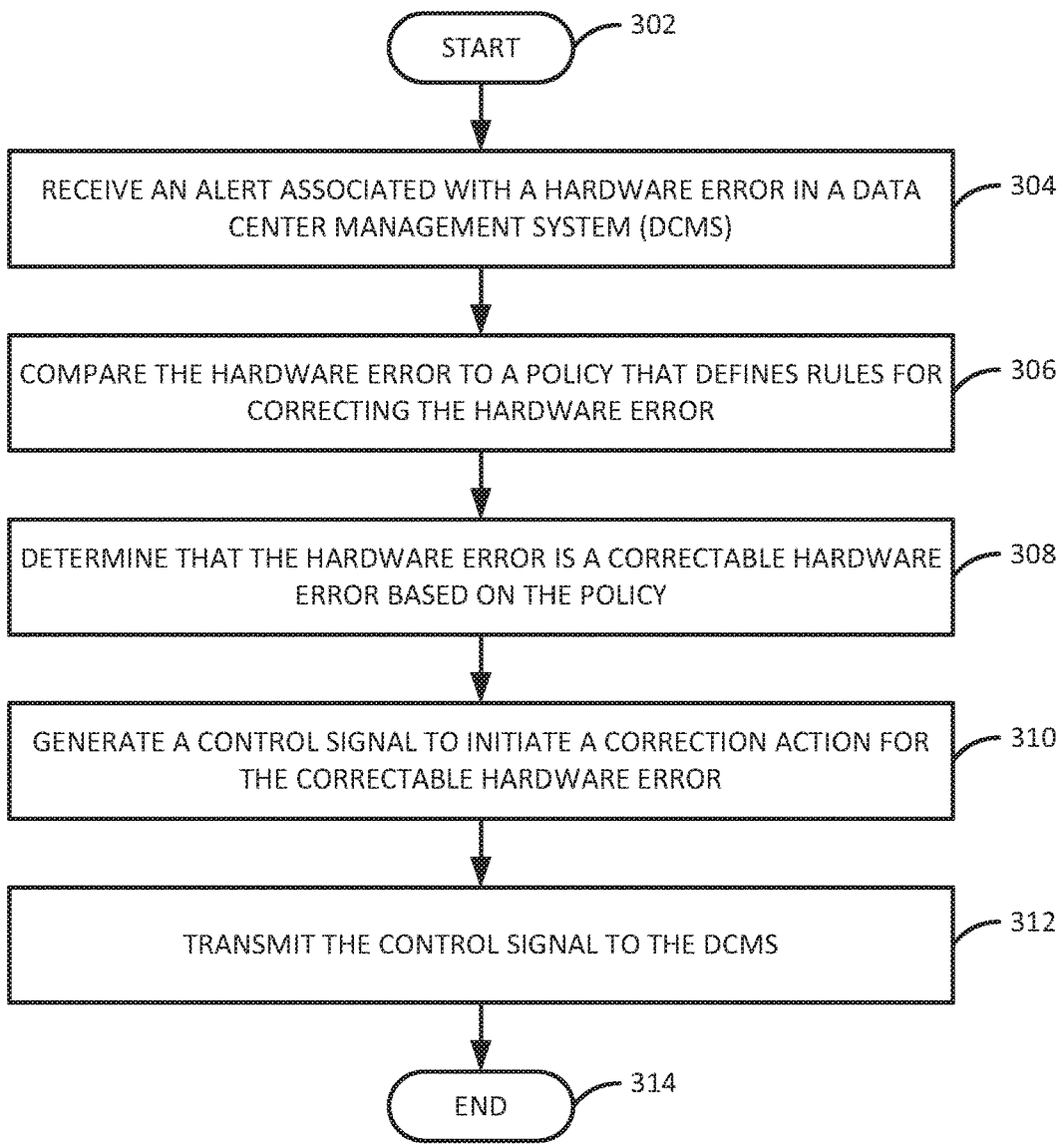
FIG. 3 is a flow chart of an example method for automatically correcting a hardware error based on a policy.

FIG. 3 illustrates a flow diagram of an example method 300 for automatically correcting a hardware error based on a policy. In an example, the method 300 may be performed by the automated remediation engine 104 or the apparatus 400 illustrated in FIG. 4 and described below.

At block 302, the method 300 begins. At block 304, the method 300 receives an alert associated with a hardware error in a data center management system (DCMS). For example, an automated remediation engine may subscribe to alerts from the DCMS. The alerts may be generated in response to errors generated by network devices in the DCMS. A resource manager coupled to the network devices may generate an alert and forward the alerts to an alert services device in the DCMS.

In one example, the automated remediation engine may establish a secure connection to a notification service that broadcasts the alert messages. The secure connection may be established over a state change message bus (SCMB). The secure connection may be established using any type of authentication method (e.g., a login and password, a security token, and the like).

In one example, the alerts may be filtered. For example, the filter may look for key words to block unwanted alerts or alerts that are non-actionable. The key words may be related to types of network devices, certain types of errors, and the like. For example, hardware failures may not be automatically correctable, errors due to power outages may not be automatically correctable, and the like.

At block 306, the method 300 compares the hardware error to a policy that defines rules for correcting the hardware error. In one example, the policy may be defined by a customer. The policy may define what types of errors may be automatically corrected, when errors may be corrected, which network devices may be automatically corrected, and the like.

At block 308, the method 300 determines that the hardware error is a correctable hardware error based on the policy. For example, an alert may be associated with an error type that is automatically correctable based on the policy, associated with a type of network device that is automatically correctable based on the policy, may have occurred within an acceptable time period based on the policy, or any combination thereof. The alerts that are correctable may be moved to a queue for processing.

At block 310, the method 300 generates a control signal to initiate a correction action for the correctable hardware error. For example, the correctable hardware error may need a reboot of a network device. The control signal may be a signal to instruct a resource manager of the network device to initiate a reboot. In another example, the control signal may be to change a parameter of a network device. For example, a communication port number may be incorrect. The control signal may instruct a resource manager of a network device to change the communication port number for a particular interface.

At block 312, the method 300 transmits the control signal to the DCMS. In one example, the automated remediation engine may establish a secure communication path to a controller of the DCMS. The secure communication path may be established via any type of authentication method (e.g., a login and password, a security token, and the like).

The control signal may be transmitted over the secure communication path to the controller. The controller may then forward the control signal to the appropriate resource manager that controls operations of the network device associated with the control signal. The resource manager may then execute the control signal to automatically correct the error on the network device.

In one example, when the network device is successfully corrected, the resource manager of the network device may generate a notification message indicating successful correction of the network device. The notification may be transmitted back to the automated remediation engine over the secure connection that the control signal was transmitted. When the automated remediation engine receives the notification, the automated remediation engine may clear the alert from the queue and generate the control signal for the next alert in the queue and the blocks 310 and 312 may be repeated for each alert in the queue.

In one example, the successful correction of the network device may be logged. For example, the automated remediation engine may create and store a log of each error correction event. The log may include details such as a time that the control signal was generated and transmitted back to the DCMS, which network device was automatically corrected, what type of error was corrected, an indication if a notification was received indicating a successful correction of the network device, a time the notification was received, and the like.

As a result, the method 300 may automatically correct certain errors for network devices in a DCMS. Thus, errors may be more efficiently cleared and corrected without manual intervention from a technician. At block 314, the method 300 ends.

Figure 4:
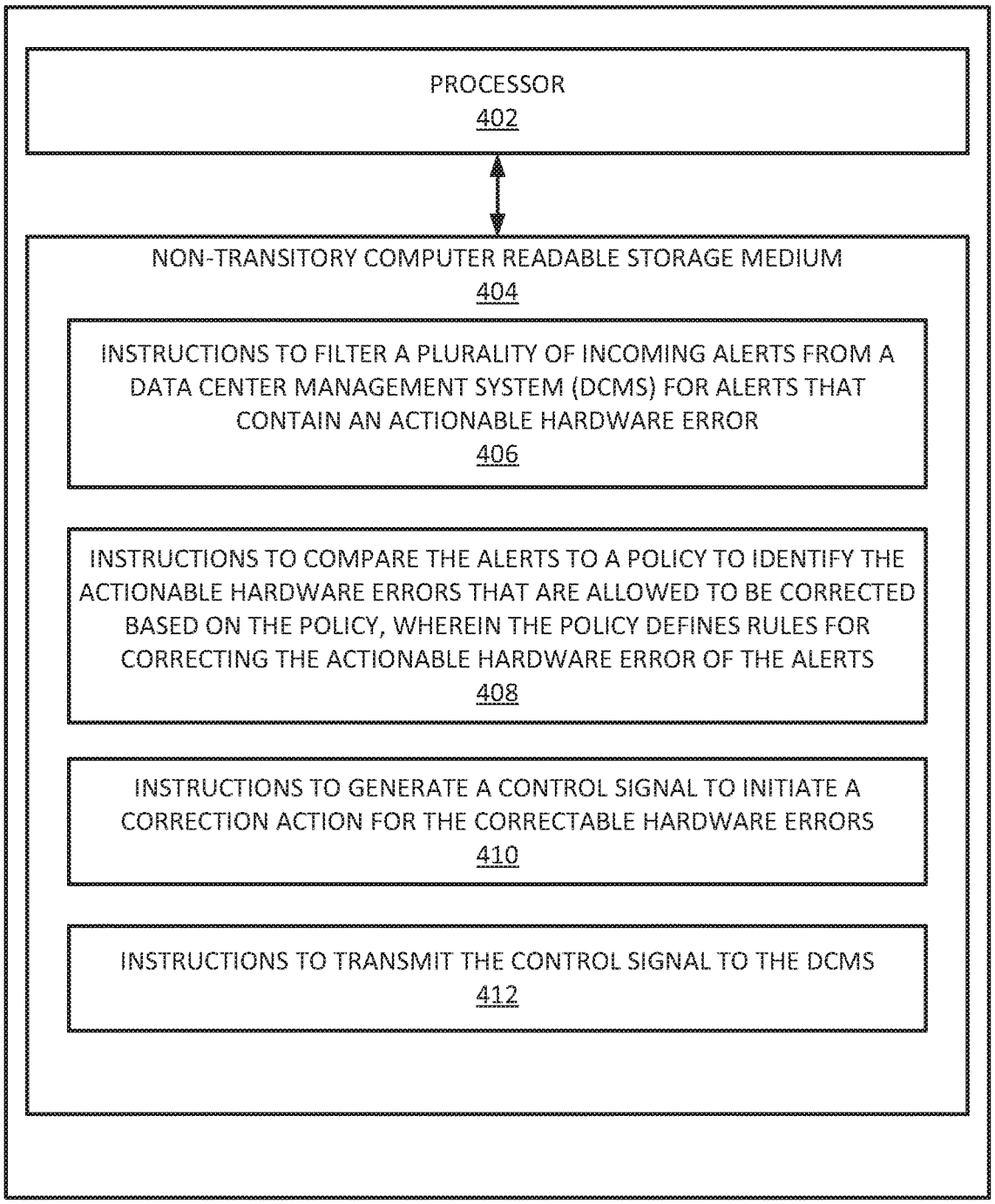
FIG. 4 is a block diagram of an example non-transitory computer readable storage medium storing instructions executed by a processor.

FIG. 4 illustrates an example of an apparatus 400. In an example, the apparatus 400 may be the automated remediation engine 104 illustrated in FIG. 1. In an example, the apparatus 400 may include a processor 402 and a non-transitory computer readable storage medium 404. The non-transitory computer readable storage medium 404 may include instructions 406, 408, 410, and 412 that, when executed by the processor 402, cause the processor 402 to perform various functions.

In an example, the instructions 406 may include instructions to filter a plurality of incoming alerts from a data center management system (DCMS) for alerts that contain an actionable hardware error. The instructions 408 may include instructions to compare the alerts to a policy to identify the actionable hardware errors that are allowed to be corrected based on the policy, wherein the policy defines rules for correcting the actionable hardware error of the alerts. The instructions 410 may include instructions to generate a control signal to initiate a correction action for the correctable hardware errors. The instructions 412 may include instructions to transmit the control signal to the DCMS.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a communication interface to receive alerts associated with hardware errors from a data center management system (DCMS);
a non-transitory computer readable storage medium to store a policy that defines rules for correcting the hardware errors associated with the alerts, wherein the rules for correcting the hardware errors comprise providing permission to correct the hardware errors based on an allowable time frame of the alerts, which is outside an ignorable time frame of the alerts, for correcting the hardware errors;
a processor to i) determine whether the hardware errors are permitted to be corrected by comparing each one of the hardware errors from the alerts to the policy and ii) in response to determining that the hardware errors are permitted to be corrected, provide correctable hardware errors from the hardware errors; and
an actuator device to generate a control signal that is transmitted to the DCMS via the communication interface to initiate a correction action for the correctable hardware errors.

2. The apparatus of claim 1, further comprising:
a filter to remove non-actionable alerts.

3. The apparatus of claim 2, wherein the filter stores a plurality of keywords that are associated with the hardware errors that are correctable.

4. The apparatus of claim 1, further comprising:
a work queue to temporarily store the correctable hardware errors until a respective control signal is generated and transmitted to the DCMS.

5. The apparatus of claim 1, further comprising:
a logging device to record the correctable hardware errors that are corrected.

6. The apparatus of claim 1, further comprising:
a ticket generation device to generate a support ticket for the correctable hardware errors, wherein at least one of the correctable hardware errors is not corrected by the correction action and the generation of the support ticket is in response to determination that the at least one of the correctable hardware errors is not corrected by the correction action, and wherein the support ticket relates to a manual intervention for correcting the correctable hardware errors.

7. The apparatus of claim 1, wherein the policy is defined by a customer.

8. The apparatus of claim 1, wherein the correction signal is transmitted to a controller of the DCMS.

9. A method, comprising:
receiving, by a processor, an alert associated with a hardware error in a data center management system (DCMS);
comparing, by the processor, the hardware error to a policy that defines rules for correcting the hardware error, wherein the rules for correcting the hardware errors comprise providing permission to correct the hardware errors based on an allowable time frame of the alerts, which is outside an ignorable time frame of the alerts, for correcting the hardware errors;
determining, by the processor, whether the hardware error is permitted to be corrected by comparing the hardware error with the policy;
in response to determining that the hardware error is permitted to be corrected, providing, by the processor, that the hardware error is a correctable hardware error;
generating, by the processor, a control signal to initiate a correction action for the correctable hardware error; and
transmitting, by the processor, the control signal to the DCMS.

10. The method of claim 9, further comprising:
establishing, by the processor, a secure communication path to a state change message bus (SCMB) the DCMS to receive a plurality of alerts from the DCMS; and
filtering, by the processor, the plurality of alerts to remove non-actionable alerts.

11. The method of claim 9, further comprising:
moving, by the processor, the alert associated with the correctable hardware error to a queue.

12. The method of claim 9, further comprising:
establishing, by the processor, a secure communication path to a controller of the DCMS; and
transmitting, by the processor, the control signal to a controller of the DCMS to initiate the correction action on a hardware device that has the correctable hardware error.

13. The method of claim 12, further comprising:
receiving, by the processor, a notification that the correctable hardware error was successfully corrected.

14. The method of claim 13, further comprising:
recording, by the processor, the correctable hardware errors that was successfully corrected.

15. The method of claim 9, wherein the control signal comprises at least one of: a signal to perform a reset, a signal to perform a power cycle, or a signal to change setting.

16. A non-transitory computer readable storage medium encoded with instructions executable by a processor, the non-transitory computer-readable storage medium comprising:

instructions to filter a plurality of incoming alerts from a data center management system (DCMS) for alerts that contain an actionable hardware error;

instructions to determine whether the actionable hardware errors are permitted to be corrected by comparing each one of the actionable hardware errors from the alerts to a policy, wherein the policy defines rules for correcting the actionable hardware error of the alerts, wherein the rules for correcting the actionable hardware errors comprise providing permission to correct the actionable hardware errors based on an allowable time frame of the alerts, which is outside an ignorable time frame of the alerts, for correcting the actionable hardware errors, wherein the ignorable time frame of the alerts is defined as a scheduled time period between a beginning time and an end time;

instructions to provide correctable actionable hardware errors from the actionable hardware errors, in response to determining that the actionable hardware errors are permitted to be corrected;

instructions to generate a control signal to initiate a correction action for the correctable hardware errors; and instructions to transmit the control signal to the DCMS.

17. The non-transitory computer readable storage medium of claim 16, wherein the rules for correcting the actionable hardware errors comprise providing permission to correct the actionable hardware errors based on at least one of a list of hardware devices of the DCMS that are allowed to be corrected or a list of actionable hardware errors that are allowed to be corrected.

18. The non-transitory computer readable storage medium of claim 16, wherein the rules comprise a location of hardware devices of the DCMS that are allowed to be corrected.

19. The non-transitory computer readable storage medium of claim 16, wherein the rules comprise a plurality of keywords that define types of hardware errors that are allowed to be corrected.

20. The apparatus of claim 1, wherein the rules for correcting the hardware errors further comprise providing permission to correct the hardware errors based on at least one of a list of hardware devices that are allowed to be corrected or a list of hardware errors that are allowed to be corrected.

21. The method of claim 9, wherein the rules for correcting the hardware errors further comprise providing permission to correct the hardware errors based on at least one of a list of hardware devices that are allowed to be corrected or a list of hardware errors that are allowed to be corrected.

22. The method of claim 1, wherein the ignorable time frame of the alerts is defined as a scheduled time period between a beginning time and an end time.

* * * * *